United States Patent [19]
Sheynblat et al.

[11] Patent Number: 5,646,630
[45] Date of Patent: Jul. 8, 1997

[54] NETWORK OF EQUIVALENT GROUND TRANSMITTERS

[75] Inventors: Leonid Sheynblat, Belmont, Calif.; Harold Lewis Longaker, Houston, Tex.

[73] Assignee: Trimble Navigation Limited, Sunnyvale, Calif.

[21] Appl. No.: 650,731

[22] Filed: May 20, 1996

[51] Int. Cl.$^6$ .............................. H04B 7/185; G01S 5/02
[52] U.S. Cl. .................... 342/357; 342/457; 342/463; 364/449.1
[58] Field of Search ................................... 342/357, 457, 342/463, 464; 364/449

[56] References Cited

U.S. PATENT DOCUMENTS 5,422,813  6/1995  Schuchman et al. ................... 342/357

*Primary Examiner*—Theodore M. Blum
*Attorney, Agent, or Firm*—Boris G. Tankhilevich

[57] ABSTRACT

A system for differential navigation of an autonomous vehicle in the location with the limited visibility of the sky is disclosed. The system employs a plurality of satellites, a plurality of ground transmitters, and a base station. Different configurations for the minimum number of the satellites and the minimum number of ground transmitters are disclosed.

55 Claims, 3 Drawing Sheets

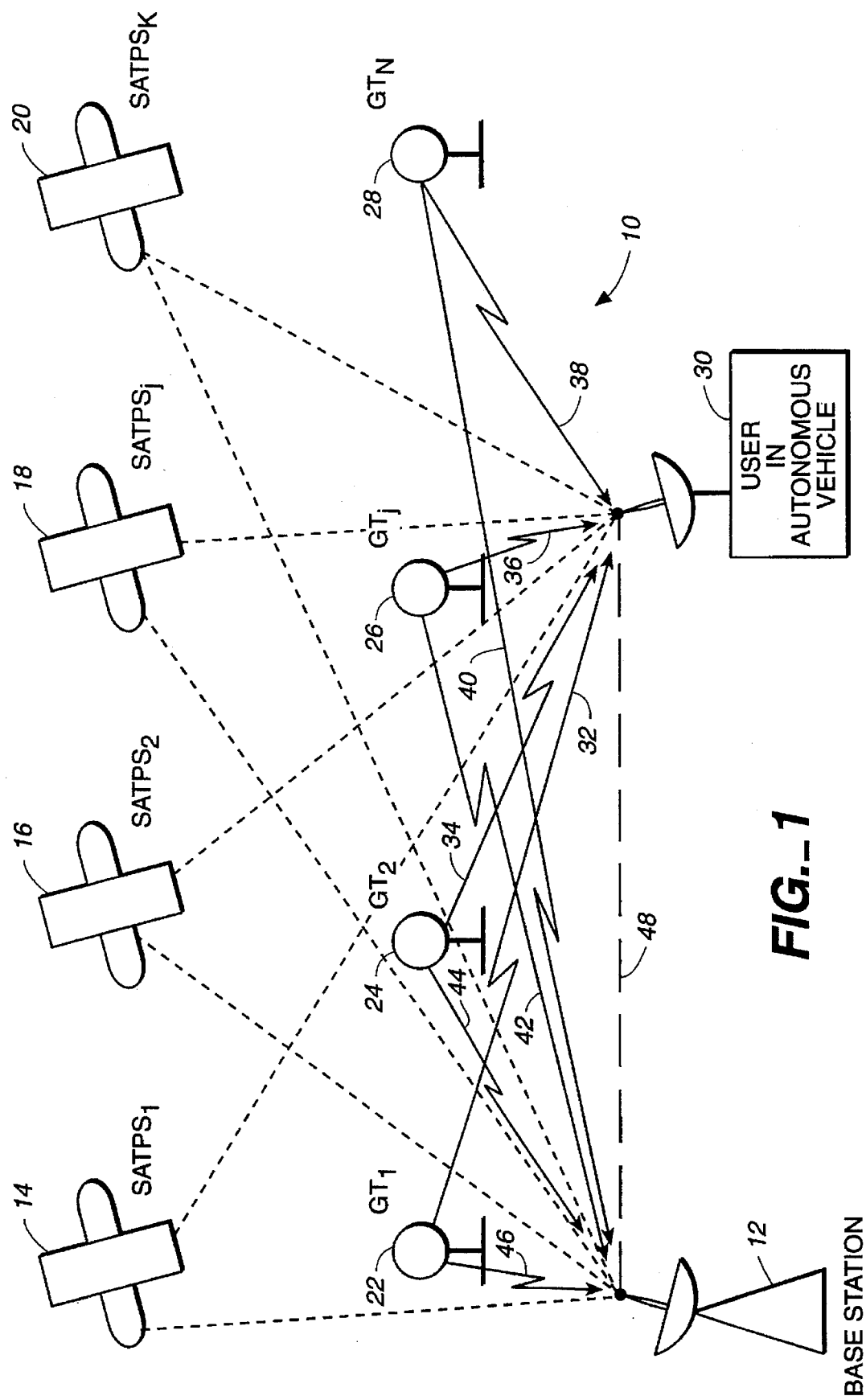
FIG._1

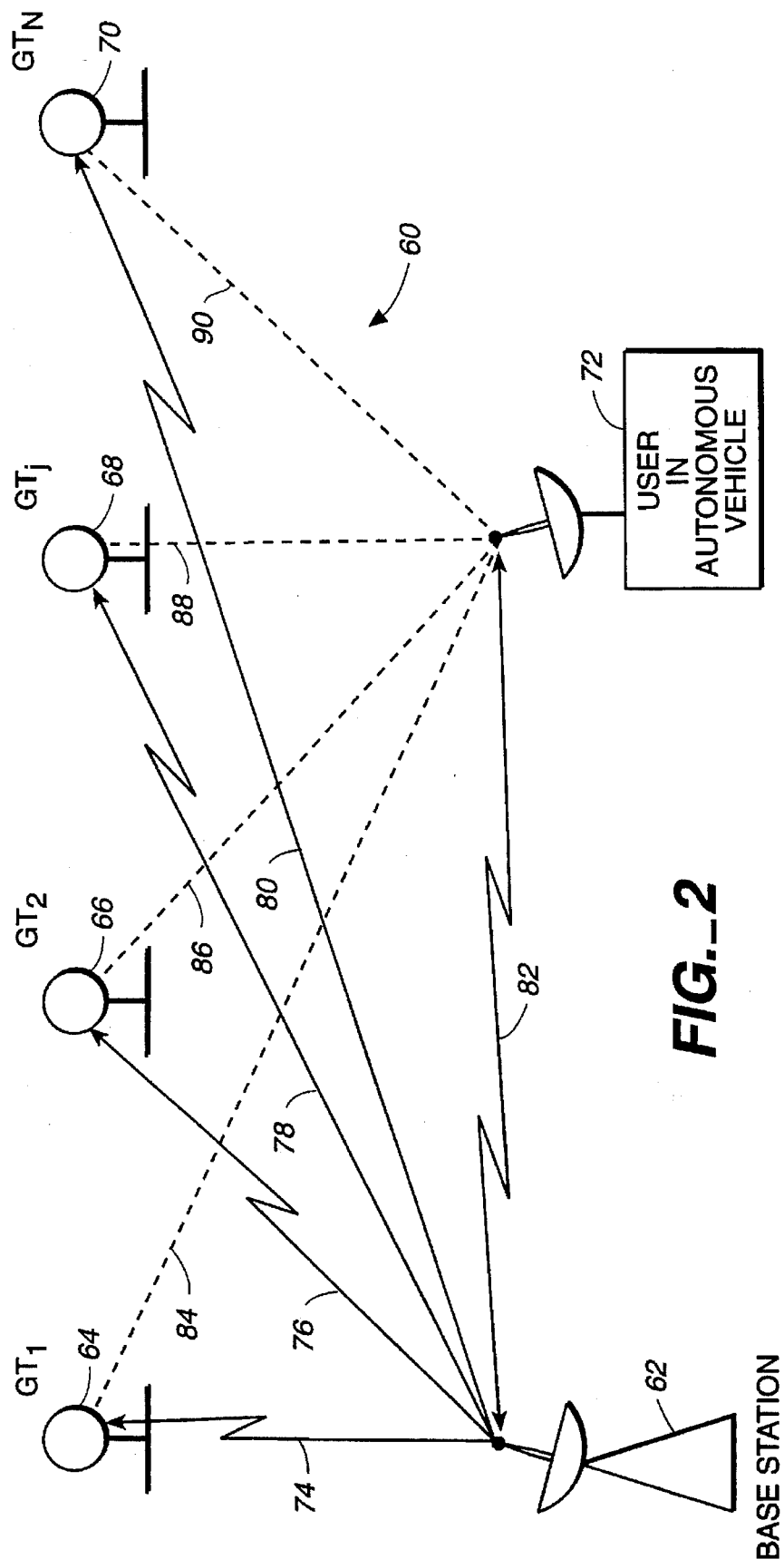
FIG._2

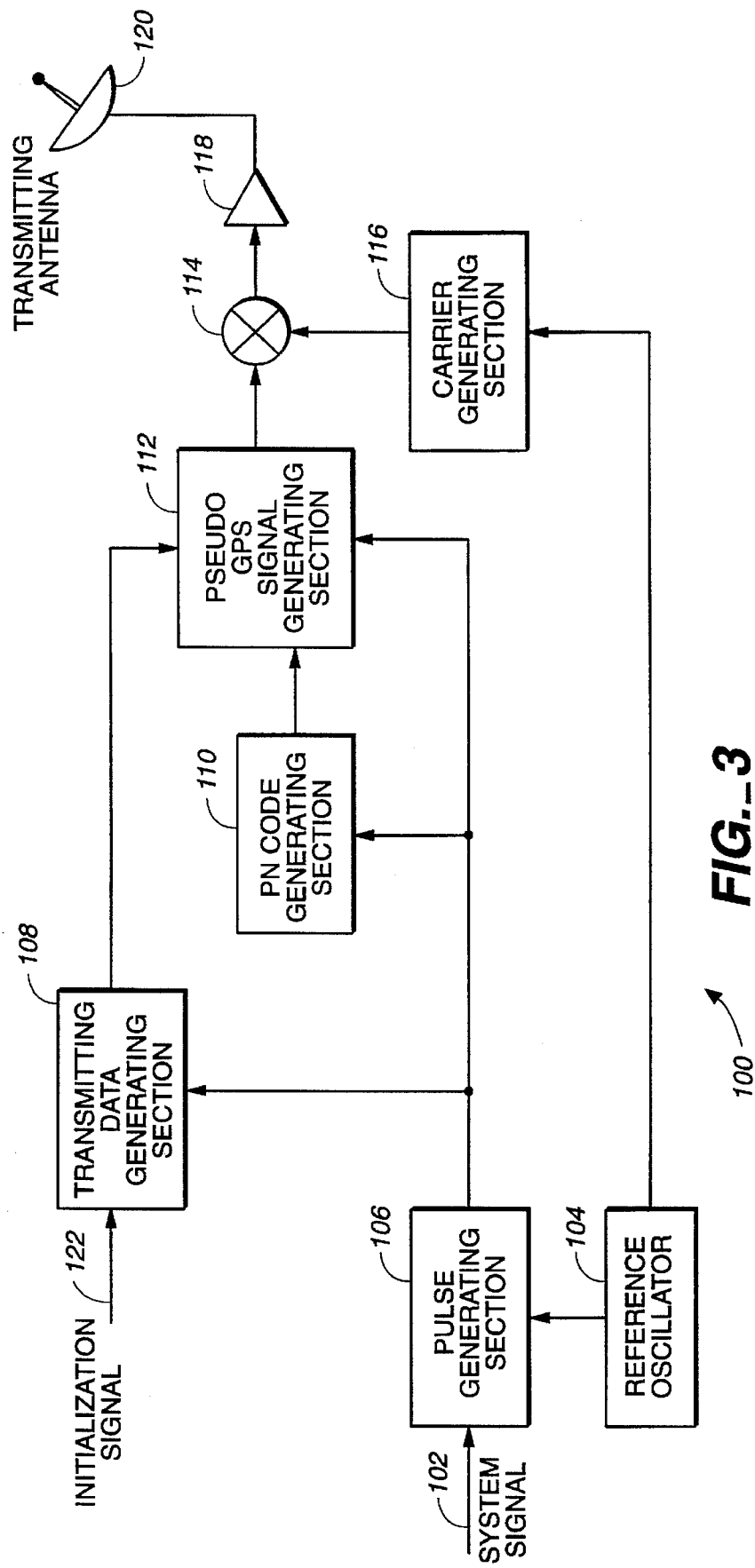
FIG._3

NETWORK OF EQUIVALENT GROUND TRANSMITTERS

BACKGROUND

The Global Positioning System (GPS) is a widely used satellite-based navigation system consisting of a network of satellites broadcasting pseudo-random noise (PRN) codes modulated on an L-band carrier (L1, L2). A GPS receiver uses measurements of the pseudo-random (PRN) code-phase and carrier-phase from four or more satellites to solve for the three-dimensional position of the receiver and to calibrate its internal time reference. The GPS receiver determines velocity from measurements of the carrier phase and doppler. Accuracy of the GPS solution is limited by the errors on the GPS signals and the geometry established by the positions of the satellites relative to the user.

For instance, there are areas of limited visibility of the sky where the user can observe and receive the satellite signals from only a limited number of the Satellite Positioning System (SATPS) satellites. Thus, in such an area it is impossible for the user to precisely solve for the three-dimensional position of its receiver, to calibrate its internal time reference, or to determine its velocity.

What is needed is a system of networked ground transmitters (GT) located in the well-known positions that together with the visible SATPS satellites and together with the base station positioned in the precisely known location allows the user to precisely determine its position location, its timing, and its velocity.

SUMMARY

The present invention is unique because it discloses a system of networked equivalent ground transmitters (GT) located in the well-known positions that together with the visible SATPS satellites and together with the base station allows one to precisely determine the position location, timing, and velocity of an autonomous vehicle.

The first aspect of the present invention is directed to a system (A) for accurate determination of the terrestrial position, timing coordinate, and velocity of an autonomous vehicle in real-time by transmitting signals from well-known locations.

The system (A) comprises: (1) a K-number of $SATPS_j$ satellites, K being an integer, j being an integer less than or equal to K, for generating satellite signals $L(SATPS_j)$; (2) an N-number of ground transmitters $(GT_i)$, N being an integer, i being an integer less or equal to N, for generating $L(GT_i)$ signals for providing ranging, timing, and velocity information at the user's location; (3) a base station (BS) for receiving the $L(SATPS_j)$ signals from each $SATPS_j$ satellite, for receiving the $L(GT_i)$ signals from each $GT_i$, for calculating the differential correction data signal L(BS), and for transmitting the differential correction data signal L(BS) to the user's location; (4) a 2N-number of ground transmitter communication links $CLGT_i$ between each $GT_i$ and the user, and between each $GT_i$ and the base station (BS); and (5) a communication link CLB between the base station and the user. The user receives the $L(SATPS_j)$ signals from each satellite $SATPS_j$, the $L(GT_i)$ signals from each $GT_i$, and the differential correction data signal L(BS) from the base station. It is assumed, that the location coordinates of each $GT_i$ and the base station are precisely known. It is also assumed that each satellite $SATPS_j$ includes a satellite clock with a known clock bias $CB_{SATPSj}$ and a known clock drift $CD_{SATPSj}$, each $GT_i$ includes a $GT_i$ clock with an unknown clock bias $CB_{GTi}$ and an unknown clock drift $CD_{GTi}$, and the base station includes a base station clock with an unknown clock bias $CB_{BS}$ and an unknown clock drift $CD_{BS}$.

In one preferred embodiment of system (A), the K-number of $SATPS_j$ satellites comprises at least one satellite, and the N-number of ground transmitters $(GT_i)$ comprises at least three $GT_i$. In another preferred embodiment, the K-number of $SATPS_j$ satellites comprises at least two satellites, and the N-number of ground transmitters $(GT_i)$ comprises at least two $GT_i$. Yet, in one more preferred embodiment, the K-number of $SATPS_j$ satellites comprises at least three satellites, and the N-number of ground transmitters $(GT_i)$ comprises at least one $GT_i$. In each of these embodiments, the user utilizes the satellite signals $L(SATPS_j)$ generated by each $SATPS_j$, the $L(GT_i)$ signals generated by each $GT_i$ and the differential correction data signal L(BS) generated by the base station (BS) in order to determine in real-time the user's position fixes, the user's timing coordinate, and the user's velocity.

Another aspect of the present invention is directed to a system (B) comprising: (1) an N-number of ground transmitters $(GT_i)$, wherein each $GT_i$ generates its own $L(GT_i)$ signal for providing ranging, timing, and velocity information at the user's location; (2) a base station (BS) for receiving the $L(GT_i)$ signals from each $GT_i$, for calculating the differential correction data signal L(BS), and for transmitting the differential correction data signal L(BS) to the user's location; (3) a 2N-number of ground transmitter communication links $CLGT_i$ between each $GT_i$ and the user, and between each $GT_i$ and the base station (BS); and (4) a communication link CLB between the base station and the user. The user receives the $L(GT_i)$ signals from each $GT_i$, and the differential correction data signal L(BS) from the base station. The location coordinates of each $GT_i$ and the base station are precisely known. Each $GT_i$ includes a $GT_i$ clock with an unknown clock bias $CB_{GTi}$ and an unknown clock drift $CD_{GTi}$; and the base station includes a base station clock with an unknown clock bias $CB_{BS}$ and an unknown clock drift $CD_{BS}$.

In one preferred embodiment of system (B), the N-number of ground transmitters $(GT_i)$ comprises at least four $GT_i$, and the user utilizes the $L(GT_i)$ signals generated by each $GT_i$ and the differential correction data signal L(BS) generated by the base station (BS) in order to determine in real-time the user's position fixes, the user's timing coordinate, and the user's velocity.

In another preferred embodiment of system (B), the N-number of ground transmitters $(GT_i)$ comprises at least one $GT_i$, and the user utilizes the $L(GT_i)$ signals generated by each $GT_i$ and the differential correction data signal L(BS) generated by the base station (BS) in order to determine in real-time the user's timing coordinate.

The communication link CLB in both systems (A) and (B) can include a variety of embodiments. It can include a radiowave frequency band, an infrared frequency band, a microwave frequency band, or the ISM (industrial scientific medical) unlicensed operation band. The ISM band range can be selected from a class of frequency range consisting of 900 MHz, 2.4 GHz, and 5.8 GHz; wherein the user can own both ends of the ISM communication system. The communication link CLB can also include: a real time circuit switched communication link, a 1.8 GHz frequency band, wherein the 1.8 GHz band supports the personal communications services (PCS); a system of Low Earth Orbiting Satellites (LEOS), wherein the LEOS is used to store and to forward digital packet data. The communication link CLB can be selected from a class of radiowave communication links consisting of a cellular telephone communication means, paging signal receiving means, wireless messaging services, wireless application services, a wireless WAN/LAN station, and an Earth-satellite-Earth communication module that uses at least one satellite to relay a radiowave signal. The communication link CLB can also include an Advanced Mobile Phone System (AMPS) including a modem, wherein the modem is selected from a class consisting of a DSP (digital signal processor) modem, and a cellular digital packet data (CDPD) modem. It can include a digital cellular telephone communication means, wherein the digital cellular telephone communication means includes a means of modulation of digital data over a radiolink selected from a class consisting of a time division multiple access (TDMA) system, and a code division multiple access (CDMA) system.

The communication link CLGT in both systems (A) and (B) can also include a variety of embodiments including a radiowave frequency band, an infrared frequency band, a microwave frequency band, and all other embodiments that were discussed in connection with the communication link CLB.

In the preferred embodiment of both systems (A) and (B), at least one GT comprises a pseudolite, and at least one communication link CLGT comprises a pseudo-GPS communication link, and at least one GT transmits pseudo-GPS signals on the L-band frequency.

Yet another aspect of the present invention is directed to a method for accurate determination of the terrestrial position, timing coordinate, and velocity of an autonomous vehicle in real-time by transmitting signals from well-known locations. The method employing the system (A) comprises the steps of: (a) providing a K-number of SATPS$_j$ satellites; (b) generating satellite signals L(SATPS$_j$) by each SATPS$_j$ satellite for providing ranging, timing, and velocity information at the user's location; (c) providing an N-number of ground transmitters; (d) generating ground transmitter L(GT$_i$) signals by each GT$_i$ for providing ranging, timing, and velocity information at the user's location; (e) providing a base station (BS); (f) receiving the L(SATPS$_j$) signals from each SATPS$_j$ satellite by the base station (BS); (g) receiving the L(GT$_i$) signals from each GT$_i$ by the base station (BS); (h) calculating the differential correction data signal L(BS) by the base station (BS); (i) transmitting the differential correction data signal L(BS) to the user's location by the base station (BS); (k) receiving the satellite L(SATPS$_j$) signals from each satellite SATPS$_j$ by the user; (1) receiving the L(GT$_i$) signals from each GT$_i$ by the user; (m) receiving the differential correction data signal L(BS) from the base station by the user; and (n) accurately determining the terrestrial position, timing coordinate, and velocity of the autonomous vehicle by the user. The method utilizing the system (A) can also include the steps of synchronization and initialization of each ground transmitter GT$_i$.

Yet another additional aspect of the present invention is directed to a method for accurate determination of the terrestrial position, timing coordinate, and velocity of an autonomous vehicle in real-time by transmitting signals from well-known locations employing the system (B). The method comprises the steps of: (a) providing an N-number of ground transmitters; (b) generating ground transmitter L(GT$_i$) signals by each GT$_i$ for providing ranging, timing, and velocity information at the user's location; (c) providing a base station (BS); (d) receiving the L(GT$_i$) signals from each GT$_i$ by the base station (BS); (e) calculating the differential correction data signal L(BS) by the base station (BS); (f) transmitting the differential correction data signal L(BS) to the user's location by the base station (BS); (g) receiving the L(GT$_i$) signals from each GT$_i$ by the user; (h) receiving the differential correction data signal L(BS) from the base station by the user; and (i) accurately determining the terrestrial position, timing coordinate, and velocity of the autonomous vehicle by the user. The method employing the system (B) can also include the steps of synchronization and initialization of each ground transmitter GT$_i$.

BRIEF DESCRIPTION OF THE DRAWINGS.

FIG. 1 illustrates a system (A) comprising K-number of satellites (SATPS$_j$), N-number of ground transmitters (GT$_i$), and a base station (BS).

FIG. 2 depicts a system (B) comprising N-number of ground transmitters (GT$_i$), and a base station (BS).

FIG. 3 shows a ground transmitter (GT) comprising a pseudolite.

FULL DESCRIPTION OF THE PREFERRED EMBODIMENT

FIG. 1 illustrates a system A (10) comprising a K-number of satellites (SATPS$_j$) (14, 16, 18, 20), an N-number of ground transmitters (GT$_j$) (22, 24, 26, 28), a base station (BS) (12), a 2N number of GTCL communication links between each GT$_i$ and base station (40, 42, 44, 46) and between each ground transmitter GT$_i$ and the user (32, 34, 36, 38), and a communication link CLB (48) between the base station and the user's receiver placed in an autonomous vehicle (30).

The autonomous vehicle (30) has the limited visibility of the sky. The satellites 14, 16, 18, and 20 provide the satellite signals which are received by the base station (BS) 12 and by the user's receiver. In the disclosed embodiment the ground transmitters (GT) do not include the receiving antennas and do not have the satellite tracking capabilities. Thus, the GT does not suffer from the "near-far" problem, because there is no interference between the receiving and the transmitting antennas.

The first element of the present embodiment is the GPS, that is a system of satellite signal transmitters, with user's receivers located on the Earth's surface or adjacent to the Earth's surface, that transmits information from which an observer's present location, velocity, and/or the time of observation can be determined. There is also the Global Orbiting Navigational Satellite System (GLONASS), which can operate as an alternative or an additional GPS system.

The Global Positioning System (GPS) is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and radio access to four or more such satellites can be used to determine an observer's position anywhere on the Earth's surface, 24 hours per day. Each satellite carries a satellite clock including a cesium or rubidium atomic clock to provide timing information for the signals transmitted by the satellite. Each satellite clock includes a known clock bias $CB_{SATPSj}$ and a known clock drift $CD_{SATPSj}$, because clock corrections are provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1=154 f0 and f2=120 f0 of a base frequency f0=10.23 MHz. The L1 signal from each satellite is a binary phase shift key (BPSK) modulated by two pseudo-random noise (PRN) codes in phase quadrature, designated as the C/A-code and P(Y)-code. The L2 signal from each satellite is presently BPSK modulated by only the P(Y)-code. The nature of these PRN codes is described below.

One motivation for use of two carrier signals L1 and L2 is to allow partial compensation for propagation delay of such a signal through the ionosphere, wherein delay varies approximately as the inverse square of signal frequency f (delay~$f^{-2}$). This phenomenon is discussed by MacDoran in U.S. Pat. No. 4,463,357, which discussion is incorporated by reference herein.

A signal transmitted by a particular GPS satellite is tracked by generating and matching, or correlating, the PRN code for that particular satellite. All PRN codes are known and are generated or stored in GPS receivers used by ground observers. A first PRN code for each GPS satellite, sometimes referred to as a precision code or P(Y)-code, is a relatively long, fine-grained code having an associated clock or chip rate of f0=10.23 MHz. A second PRN code for each GPS satellite, sometimes referred to as a clear/acquisition code or C/A-code, is intended to facilitate rapid satellite signal acquisition and hand-over to the P(Y)-code, and is a relatively short, coarser-grained code having a clock or chip rate of f0/10=1.023 MHz. The C/A-code for any GPS satellite has a length of 1023 chips or time increments before this code repeats. The full P(Y)-code has a length of 259 days, with each satellite transmitting a unique portion of the full P(Y)-code. The portion of P(Y)-code used for a given GPS satellite has a length of precisely one week (7.000 days) before this code portion repeats. Accepted methods for generating the C/A-code and P(Y)-code are set forth in the GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, N. Y., 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=0, 1, 2, ... 23) is the satellite slot number. These frequencies lie in two bands at 1.597–1.617 GHz (L1) and 1,240–1,260 GHz (L2). The L1 code is BPSK modulated by a C/A-code (chip rate=0.511 MHz) and by a P(Y)-code (chip rate=5.11 MHz). The L2 code is presently BPSK modulated only by the P(Y)-code. The GLONASS satellites also transmit navigational data at a rate of 50 Baud. Because the GLONASS system has chosen the FDMA approach, there is no need for multiple P(Y) or C/A codes for different GLONASS satellites. The methods for receiving, processing, and utilizing the GLONASS signals are similar to the methods used for the GPS signals.

Reference to a Satellite Positioning System or SATPS herein refers to a Global Positioning System (GPS), to a Global Orbiting Navigation Satellite System (GLONASS), and to any other compatible satellite-based system that provides information by which an observer's position, velocity, and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-Centered-Earth-Fixed (ECEF) coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS signals that compromise the accuracy of absolute position determination are similar in magnitude for stations that are physically close. The effect of these errors on the accuracy of differential position determination is therefore substantially reduced by a process of partial error cancellation.

In the disclosed embodiment of the invention the user 30 has a SATPS receiver including a SATPS antenna. The SATPS antenna receives SATPS signals from a visible plurality of SATPS satellites. The visible plurality of SATPS can include from zero SATPS and up to four or more SATPS satellites depending on the particular environment where the user sitting in the autonomous vehicle is located. The antenna passes these signals to an SATPS signal receiver/processor, which (1) identifies the SATPS satellite source for each SATPS signal, (2) determines the travel time taken for each identified SATPS signal to arrive at the antenna, and (3) determines the present location of the SATPS antenna from this information and from the ephemeris information for each identified SATPS satellite. The SATPS signal antenna and signal receiver/processor are part of the user segment of a particular SATPS, the Global Positioning System, as discussed by Tom Logsdon, op cit, p 33–90.

Each SATPS receiver includes two different types of tracking loops. The code-tracking loop tracks the C/A-code and/or P(Y)-code pulse trains to obtain the signal travel time for each relevant satellite. The phase-lock loop tracks the satellite's carrier wave to obtain its carrier phase. Code-tracking allows the receiver to measure the appropriate pseudo-ranges. Carrier phase tracking allows the receiver to measure the corresponding instantaneous carrier phase.

The navigation processor uses the pseudo-range, the carrier phase, and doppler measurements to determine the instantaneous position coordinates and the instantaneous velocity components of the GPS receiver.

The second element of the system (A) is a base station (BS) 12 (see FIG. 1). The base station is an indispensable part of the differential navigation system. In order to encourage widespread adoption of differential navigation, the Radio Technical Commission for Maritime Services established the Special Committee 104 (SC-104) in November 1983 to develop recommendations on standards for the broadcast of differential corrections to users of the GPS and to define the communication link CLB (see 48 in FIG. 1) between the reference station (base station) and the users.

The conventional form of differential GPS consists of s fixed base station placed at a known location which determines the range and range-rate measurement errors in each received GPS signal and communicates these as corrections to be applied by local users. The base station (BS) 12 has its own imprecise clock with the clock bias $CB_{BASE}$. As a result, the local users are able to obtain more accurate navigation results relative to the base station location and the base station clock. With proper equipment, a relative accuracy of 5 meters should be possible at distances of a few hundred kilometers from the base station. In addition to better navigational accuracy, differential GPS also improves navigational reliability by assuring the user that the GPS signals are being checked and eliminated if necessary.

Special Committee 104 has released special data exchange protocols and message formats for the differential corrections. In particular, the SC-104 recommendations call for a 100-bit-per-second data stream using phase-shift-key (PSK) modulation to mark the boundaries between binary 0s and 1s. The differential corrections employ a fixed word length but variable word count format, and the parity checking schemes.

The communication link CLB (48) can be implemented using a variety of different embodiments in order to transmit the differential corrections to the user.

In general, the communication link CLB can employ a radiowave frequency band, an infrared frequency band, or a microwave frequency band.

In one embodiment, the communication link CLB can include the ISM (industrial scientific medical) unlicensed operation band, including 900 MHz, 2.4 GHz, or 5.8 GHz bands, wherein the user can own both ends of the ISM communication system. The ISM technologies are manufactured by Trimble Navigation Limited, Sunnyvale, Calif., Metricore, Los Gatos, Calif., and by Utilicom, Santa Barbara, Calif.

In another embodiment, the communication link can employ a 1.8 GHz band that supports the personal communications services (PCS). The PCS uses the international standard DCS-1800. In yet one more embodiment, the communication link can include a real time circuit switched communication link. For instance, the communication link employing a real time circuit switched communication link can include the Iridium satellite system produced by Motorola, Schaumburg, Ill. In one additional embodiment, the communication link can employ a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20–30) GHz range are manufactured by Cellular Communications located in Redmond, Wash., and the LEOS systems in (1.6–2.5) GHz range are produced by Loral/Qualcomm located in San Diego, Calif.

The communication link CLB can also include a cellular telephone communication means, a paging signal receiving means, wireless messaging services, wireless application services, a wireless WAN/LAN station, or an Earth-satellite-Earth communication module that uses at least one satellite to relay a radiowave signal.

In another embodiment, the communication link CLB includes the cellular telephone; communication means that can include an Advanced Mobile Phone System (AMPS) with a modem. The modem can comprise a DSP (digital signal processor) modem in 800 MHz range, or a cellular digital packet data (CDPD) modem in 800 MHz range. The cellular digital communication means includes a means of modulation of digital data over a radiolink using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

The next element of the system (A) includes a plurality of ground transmitters ($GT_i$). The ground transmitters can include any device capable of generating $L(GT_i)$ signals for providing ranging, timing, and velocity information at the user's location.

Each ground transmitter $GT_i$ has an imprecise clock with the clock bias $CB_{GT_i}$. In one embodiment, the synchronization signal (in the pseudolite embodiment signal 102 of FIG. 3) is used to synchronize the pseudolite clocks for all ground transmitters. This synchronization signal can be supplied by the base station (BS) using the communication link CLB (48 of FIG. 1).

It is assumed that each ground transmitter $GT_i$ precisely knows its position location. Thus, each ground transmitter has to be surveyed in order to determine its precise location. The initialization signal (that can be supplied by the base station) can provide the necessary location information to each ground transmitter (in the pseudolite embodiment signal 122 of FIG. 3).

Each ground transmitter uses a communication link CLGT (32, 34, 36, 38) for transmitting the $L(GT_i)$ signals to the user (30). The communication link CLGT cart be implemented using a variety of different embodiments.

In general, the communication link CLGT can employ the same embodiments as the communication link CLB fully discussed above. For instance, the communication link CLGT can employ a radiowave frequency band, an infrared frequency band, a microwave frequency band, the ISM (industrial scientific medical) unlicensed operation band, including 900 MHz, 2.4 GHz, or 5.8 GHz bands, wherein the user can own the both ends of the ISM communication system, and so on.

In the preferred embodiment, the ground transmitter $GT_i$ can be implemented using a pseudolite (100) depicted in FIG. 3. As shown in FIG. 3, the pseudolite $GT_i$ generates and transmits the pseudo-GPS signals. In the simplest approach, ground transmitter-pseudolite $GT_i$ transmits on L-band (i.e., GT-band is the GPS signal band, for instance L2 frequency) and modulates that signal with its own unique PRN code (112). This code can provide anti-jamming capability and also serve as an identification of a particular (i) $GT_i$ as a source of the signal. The $L(GT_i)$ signal can be modulated with the data that allows a user to determine the precise coordinates of the $GT_i$ location. The precise location can be omitted from the $GT_i$ output data if the user is capable of looking up that information based on the $GT_i$ ($ID_i$) number (PRN code can be used as an ($ID_i$) number).

In general, the use of a single base station may be insufficient to receive the $L(GT_i)$ signals from all ground transmitters $GT_i$. This is the case of a limited $GT_i$-visibility. In the case of the limited $GT_i$- visibility, the preferred embodiment includes a plurality of the base stations sufficient to receive the $L(GT_i)$ signals from each $GT_i$. The case of the limited $GT_i$-visibility also constitutes the subject-matter of the present invention.

The following discussion is limited to the case of a full $GT_i$-visibility. The following discussion is focused on the determination of the minimum structure including the minimum number K of the SATPS satellites, the minimum number N of ground transmitters $GT_i$, and a single base station necessary to solve for the three-dimensional position of the receiver and to calibrate its internal time reference. A similar discussion can be focused on the measurements of the range-rate and doppler necessary to determine velocity of the user.

The following equations to determine the minimum structure will be written only for pseudo-ranges. The similar system of equations can be written for the carrier phase measurements. This carrier phase system of equations yields the same result for the minimum structure if the carrier phase ambiguities can be resolved without additional measurements.

The pseudo-range signal $PR_{USER}(SATPS_j)$ received by the user (30 of FIG. 1) from each of a j-number of visible satellites $SATPS_j$ can be expressed as:

$$PR_{USER}(SATPS_j)=R_{USER}(SATPS_j)+\Delta R(SATPS_j)+CB_{SATPSj}+CB_{USER}+(noise)+(multipath); \quad (1)$$

where $$R_{USER}(SATPS_j)=\sqrt{((X_{USER}-X_{SATPSj})^2+(Y_{USER}-Y_{SATPSj})^2+(Z_{USER}-Z_{SATPSj})^2)} \quad (2)$$

represents the "nominal" range from the user to the satellite $SATPS_j$, wherein $X_{USER}$, $Y_{USER}$, and $Z_{USER}$ are the unknown user's coordinates, and wherein the three coordinates ($X_{SATPSj}$, $Y_{SATPSj}$, and $Z_{SATPSj}$) of each satellite $SATPS_j$ are known up to one unknown variable $\Delta R(SATPS_j)$;

$CB_{SATPSj}$ represents a known clock bias associated with the satellite's $SATPS_j$ precise clock; and $CB_{USER}$ is an unknown clock bias associated with the user's imprecise clock.

In the preferred embodiment, the user's clock bias $CB_{USER}$ is an unknown variable because the user's clock is imprecise. On the other hand, the satellite clock biases $CB_{SATPSj}$ are known variables, because the satellites employ the precise atomic clocks with very small biases that are controlled periodically by synchronization with the Ground Control Station.

Thus, we have a j-number of equations with 3 unknown user's coordinates $X_{USER}$, $Y_{USER}$, and $Z_{USER}$, with one unknown user's clock bias $CB_{USER}$, and with a j-number of unknown variables $\Delta R(SATPS_j)$.

The pseudo-range signal $PR_{USER}(GT_i)$ received by the user 30 from each of the N-number of ground transmitters $GT_i$ can be expressed as:

$$PR_{USER}(GT_i)=R_{USER}(GT_i)+CB_{GTi}+CB_{USER}+(noise)+(multipath); \quad (3)$$

where $$R_{USER}(GT_i)=\sqrt{((X_{USER}-X_{GTi})^2+(Y_{USER}-Y_{GTi})^2+(Z_{USER}-Z_{GTi})^2)}; \quad (4)$$

represents the "nominal" range from the user to the ground transmitter $GT_i$, wherein $X_{USER}$, $Y_{USER}$, and $Z_{USER}$ are the unknown user's coordinates, and wherein the three coordinates ($X_{GTi}$, $Y_{GTi}$, $Z_{GTi}$) of each ground transmitter $GT_i$ are precisely known;

$CB_{USER}$ is an unknown clock bias associated with the user's imprecise clock; and $CB_{GTi}$ are the unknown clock biases of the imprecise clocks of the ground transmitters.

The equation (3) can be written for each of the N-number of ground transmitters.

The pseudo-range signal $PR_{BASE}(SATPS_j)$ received by the base station BS (12) from each of a j-number of visible satellites $SATPS_j$ can be expressed as:

$$PR_{BASE}(SATPS_j)=R_{BASE}(SATPS_j)+CB_{SATPSj}+CB_{BASE}+\Delta R(SATPS_j)+(noise)+(multipath); \quad (5)$$

where $$R_{BASE}(SATPS_j)=\sqrt{((X_{BASE}-X_{SATPSj})^2+(Y_{BASE}-Y_{SATPSj})^2+(Z_{BASE}-Z_{SATPSj})^2)}; \quad (6)$$

represents the "nominal" range from the base station to the satellite $SATPS_j$, wherein $X_{BASE}$, $Y_{BASE}$, and $Z_{BASE}$ are precisely known base station's coordinates, and wherein the three coordinates ($X_{SATPSj}$, $Y_{SATPSj}$, $Z_{SATPSj}$) of each satellite $SATPS_j$ are known up to one unknown variable $\Delta R(SATPS_j)$;

$CB_{SATPSj}$ represents a known clock bias associated with the satellite's $SATPS_j$ precise clock; and $CB_{BASE}$ is an unknown clock bias associated with the base station's imprecise clock.

The equation (5) can be written for each of the (j) visible satellites $SATPS_j$. Thus, we have a j-number of equations for one additional unknown base station's clock bias $CB_{BASE}$.

Finally, the pseudo-range signal $PR_{BASE}(GT_i)$ received by the base station 12 from each of the N-number of ground transmitters $GT_i$ can be expressed as:

$$PR_{BASE}(GT_i)=R_{BASE}(GT_i)+CB_{GTi}+CB_{BASE}+(noise)+multipath; \quad (7)$$

where $$R_{BASE}(GT_i)=\sqrt{((X_{BASE}-X_{GTi})^2+(Z_{BASE}-Z_{GTi})^2)}; \quad (8)$$

represents the "nominal" range from the base station to the ground transmitter $GT_i$, wherein $X_{BASE}$, $Y_{BASE}$, and $Z_{BASE}$ are the precisely known base station's coordinates, and wherein the three coordinates ($X_{GTi}$, $Y_{GTi}$, $Z_{GTi}$) of each ground transmitter $GT_i$ are precisely known;

$CB_{BASE}$ is an unknown clock bias associated with the base station's imprecise clock; and $CB_{GTi}$ are the unknown clock biases of the imprecise clocks of the ground transmitters.

The equation (7) can be written for each of the N-number of ground transmitters.

In the relative or differential mode, the pseudo-range and carrier phase measurements are differenced to get rid of the common mode errors. For instance, if we difference pseudo-range measurements from user to $SATPS_j$ and from the base to $SATPS_j$ (Eq's 1 and 5), then the satellite clock bias error ($CB_{SATPSj}$) cancels out, and error in the j-satellite position $\Delta R(SATPS_j)$ cancels out. The single-differenced measurement then becomes:

$$PR_{USER,\,BASE}(SATPS_j) = R_{USER}(SATPS_j) - R_{BASE}(SATPS_j) + CB_{USER} - CB_{BASE} + (noise) + (multipath); \quad (9)$$

wherein the user clock bias error is now relative to the base clock bias error ($CB_{USER} - CB_{BASE}$). The single-differenced equation (9) still includes the range from user to SATPS$_j$ with its three unknowns (X, Y, Z)$_{USER}$. The user receiver in the differential mode, described by Eq. 9 above, does not solve for the absolute clock bias error at the base ($CB_{BASE}$), but for the relative clock bias error ($CB_{USER} - CB_{BASE}$). Thus, we need only four measurements for four unknowns (X, Y, Z)$_{USER}$ and ($CB_{USER} - CB_{BASE}$).

In the carrier phase relative positioning systems (such as OTF RTK Total Station), a double difference measurement is used to solve for the unkown user coordinates via a baseline computation (from base to user). The single-differenced measurement of Eq. 9 is differenced with another single-differenced measurement (computed between user, base, and another SATPS$_k$, wherein the clock error is again a relative clock between user and base), to produce a double-differenced measurement which is totally independent of any clock errors. Double-differenced measurements contain only three unknowns (X, Y, Z)$_{USER}$. It takes four measurements to derive three independent double-differenced measurements. Thus, we need four carrier phase measurements to solve for three spatial unkowns ($\Delta X$, $\Delta Y$, $\Delta Z$).

Thus, equations (1)–(9) allow one to determine the minimum structure of the system (A), which is how many ground transmitters are needed for the differential navigation of the autonomous vehicle with the user if the user has the limited visibility of the sky. The visibility is defined as the number of satellites that the user can use for measurement purposes.

(1) The visibility of the sky is 0, that is, the user cabot see or track any satellite. If this is the case, the minimum number of ground transmitters needed for the differential navigation is equal to 4. Thus, the first combination is:

0 SATPS+4GT.

(2) The visibility of the sky is 1, that is, the user can track only one satellite. If this is the case, the minimum number of ground transmitters needed for the differential navigation is equal to 3. Thus, the second combination is:

1 SATPS+3GT.

(3) The visibility is 2. The minimum structure is:

2 SATPS+2GT.

(4) The visibility is 3. The minimum structure is:

3 SATPS+1GT.

(5) The visibility is 4. The minimum structure is:

4 SATPS+0GT.

The velocity of the user can be determined by solving the system of equations similar to the system of equations (1)–(9) for the range-rate measurements.

The preferred embodiment of the present invention also includes a system (B) depicted in FIG. 2. The system (B) is the system (A) without satellites. Therefore, the discussion given above and related to the system (A) is fully applicable to the system (B). Thus, the minimum structure for the system (B) is the first minimum structure of the system (A), that is

0 SATPS+4GT.

The system (B) can be also solved for the so called time-transfer embodiment, wherein we are interested only in the timing coordinate at the user's location (we do not care about the user's coordinates). If this is a case, the minimum structure is:

0SATPS+1GT.

The preferred embodiment of the present invention also includes a method employing the system (A) for accurate determination of the terrestrial position, timing coordinate, and velocity of an autonomous vehicle in real-time by transmitting signals from a well-known location.

The method comprises the following steps. At first, we have to provide a K-number of SATPS$_j$ satellites in order to generate the satellite signals L(SATPS$_j$) for providing ranging, timing, and velocity information at the user's location. Next, we provide an N-number of ground transmitters for generating ground transmitter L(GT$_i$) signals for providing ranging, timing, and velocity information at the user's location. We also provide a base station (BS) for receiving the L(SATPS$_j$) signals from each SATPS$_j$ satellite, for receiving the L(GT$_i$) signals from each GT$_i$, for calculating the differential correction data signal L(BS), and for transmitting the differential correction data signal L(BS) to the user's location.

In the following steps, the user receives the satellite L(SATPS$_j$) signals from each satellite SATPS$_j$, the L(GT$_i$) signals from each GT$_i$, the differential correction data signal L(BS) from the base station, and accurately determines its terrestrial position, timing coordinate, and velocity.

The method employing the system (A) can further include a step of providing a synchronization signal to each said GT$_i$ in order to synchronize clocks for all ground transmitters. This synchronization step can be performed by transmitting the synchronization signal from the base station. The method employing the system (A) can additionally include a step of initialization of each GT$_i$, that is, to provide the initial precise location coordinates for each ground transmitter.

The present embodiment also includes the method employing the system (B) for accurate determination of the terrestrial position, timing coordinate, and velocity of an autonomous vehicle in real-time by transmitting signals from wellknown locations. This method is similar to the method employing the system (A), but does not include the steps related to the satellites SATPS.

The description of the preferred embodiment of this invention is given for the purposes of explaining the principles thereof, and is not to be considered as limiting or restricting the invention since many modifications may be made by the exercise of skill in the art without departing from the scope of the invention.

What is claimed is:

1. A system for accurate determination of the terrestrial position, timing coordinate, and velocity of an autonomous vehicle in real-time by transmitting signals from well-known locations, said system comprising:

a K-number of SATPS$_j$ satellites, K being an integer, j being an integer less or equal to K, for generating satellite signals L(SATPS$_j$) for providing ranging, timing, and velocity information at the user's location;

an N-number of ground transmitters (GT$_i$), N being an integer, i being an integer less or equal to N, for generating L(GT$_i$) signals for providing ranging, timing, and velocity information at the user's location;

a base station (BS) for receiving said L(SATPS$_j$) signals from each said SATPS$_j$ satellite, for receiving said L(GT$_i$) signals from each said GT$_i$, for calculating the differential correction data signal L(BS), and for transmitting the differential correction data signal L(BS) to said user's location;

a 2N-number of ground transmitter communication links CLGT$_i$ between each said GT$_i$ and said user, and between each said GT$_i$ and said base station (BS); and a communication link CLB between said base station and said user;

wherein said user receives the L(SATPS$_j$) signals from each said satellite SATPS$_j$; and wherein said user receives the L(GT$_i$) signals from each said GT$_i$; and wherein said user receives said differential correction data signal L(BS) from said base station; and wherein the location coordinates of each said GT$_i$ and said base station are precisely known; and wherein each said satellite SATPS$_j$ includes a satellite clock with a known clock bias CB$_{SATPSj}$ and a known clock drift CD$_{SATPSj}$; and wherein each said GT$_i$ includes a GT$_i$ clock with an unknown clock bias CB$_{GTi}$ and an unknown clock drift CD$_{GTi}$; and wherein said base station includes a base station clock with an unknown clock bias CB$_{BS}$ and an unknown clock drift CD$_{BS}$.

2. The system of claim 1, wherein said K-number of SATPS$_j$ satellites comprises at least one satellite, and wherein said N- number of ground transmitters (GT$_i$) comprises at least three GT$_i$, and wherein said user utilizes the satellite signals L(SATPS$_j$) generated by each said SATPS$_j$, and wherein said user employs the L(GT$_i$) signals generated by each said GT$_i$, and wherein said user uses the differential correction data signal L(BS) generated by said base station (BS) in order to determine in real-time said user's position fixes, said user's timing coordinate, and said user's velocity.

3. The system of claim 1, wherein said K-number of SATPS$_j$ satellites comprises at least two satellites, and wherein said N-number of ground transmitters (GT$_i$) comprises at least two GT$_i$, and wherein said user utilizes the satellite signals L(SATPS$_j$) generated by each said SATPS$_j$, and wherein said user employs the L(GT$_i$) signals generated by each said GT$_i$, and wherein said user uses the differential correction data signal L(BS) generated by said base station (BS) in order to determine in real-time said user's position fixes, said user's timing coordinate, and said user's velocity.

4. The system of claim 1, wherein said K-number of SATPS$_j$ satellites comprises at least three satellites, and wherein said N-number of ground transmitters (GT$_i$) comprises at least one GT$_i$, and wherein said user utilizes the satellite signals L(SATPS$_j$) generated by each said SATPS$_j$, and wherein said user employs the L(GT$_i$) signals generated by each said GT$_i$, and wherein said user uses the differential correction data signal L(BS) generated by said base station (BS) in order to determine in real-time said user's position fixes, said user's timing coordinate, and said user's velocity.

5. The system of claim 1, wherein said communication link CLB includes a radiowave frequency band.

6. The system of claim 1, wherein said communication link CLB includes an infrared frequency band.

7. The system of claim 1, wherein said communication link CLB includes a microwave frequency band.

8. The system of claim 1, wherein said communication link CLB includes the ISM (industrial scientific medical) unlicensed operation band, and wherein the ISM band range is selected from a class of frequency range consisting of 900 MHz, 2.4 GHz, and 5.8 GHz; and wherein the user can own the both ends of the ISM communication system.

9. The system of claim 1, wherein said communication link CLB includes a real time circuit switched communication link.

10. The system of claim 1, wherein said communication link CLB includes a 1.8 GHz band, wherein said 1.8 GHz band supports the personal communications services (PCS).

11. The system of claim 1, wherein said communication link CLB includes a system of Low Earth Orbiting Satellites (LEOS), a system of Medium Earth Orbiting Satellites (MEOS), or a system of Geostationary Earth Orbiting Satellites (GEOS), wherein said LEOS, MEOS, or GEOS systems are used to store and to forward digital packet data.

12. The system of claim 1, wherein said communication link CLB is selected from a class of radiowave communication links consisting of a cellular telephone communication means, paging signal receiving means, wireless messaging services, wireless application services, a wireless WAN/LAN station, and an Earth-satellite-Earth communication module that uses at least one satellite to relay a radiowave signal.

13. The system of claim 1, wherein said communication link CLB includes an Advanced Mobile Phone System (AMPS) including a modem, and wherein said modem is selected from a class consisting of a DSP (digital signal processor) modem, and a cellular digital packet data (CDPD) modem.

14. The system of claim 1, wherein said communication link CLB includes a digital cellular telephone communication means, and wherein said digital cellular telephone communication means includes a means of modulation of digital data over a radiolink selected from a class consisting of a time division multiple access (TDMA) system, a code division multiple access (CDMA) system, and a frequency division multiple access (FDMA).

15. The system of claim 1, wherein at least one said communication link CLGT includes a radiowave frequency band.

16. The system of claim 1, wherein at least one said communication link CLGT includes an infrared frequency band.

17. The system of claim 1, wherein at least one said communication link CLGT includes a microwave frequency band.

18. The system of claim 1, wherein at least one said communication link CLGT includes the ISM (industrial scientific medical) unlicensed operation band, and wherein the ISM band range is selected from a class of frequency range consisting of 900 MHz, 2.4 GHz, and 5.8 GHz; and wherein the user can own the both ends of the ISM communication system.

19. The system of claim 1, wherein at least one said communication link CLGT includes a real time circuit switched communication link.

20. The system of claim 1, wherein at least one said communication link CLGT includes a 1.8 GHz band, wherein said 1.8 GHz band supports the personal communications services (PCS).

21. The system of claim 1, wherein at least one said communication link CLGT includes a system of Low Earth Orbiting Satellites (LEOS), a system of Medium Earth Orbiting Satellites (MEOS), or a system of Geostationary Earth Orbiting Satellites (GEOS), wherein said LEOS, MEOS, or GEOS systems are used to store and to forward digital packet data.

22. The system of claim 1, wherein at least one said communication link CLGT is selected from a class of radiowave communication links consisting of a cellular telephone communication means, paging signal receiving means, wireless messaging services, wireless application services, a wireless WAN/LAN station, and an Earth-satellite-Earth communication module that uses at least one satellite to relay a radiowave signal.

23. The system of claim 1, wherein at least one said communication link CLGT includes an Advanced Mobile Phone System (AMPS) including a modem, and wherein said modem is selected from a class consisting of a DSP (digital signal processor) modem, and a cellular digital packet data (CDPD) modem.

24. The system of claim 1, wherein at least one said communication link CLGT includes a digital cellular telephone communication means, and wherein said digital cellular telephone communication means includes a means of modulation of digital data over a radiolink selected from a class consisting of a time division multiple access (TDMA) system, a code division multiple access (CDMA) system, and a frequency division multiple access (FDMA).

25. The system of claim 1, wherein at least one said GT comprises a pseudolite, and wherein at least one said communication link CLGT comprises a pseudo-GPS communication link, and wherein at least one said GT transmits pseudo-GPS signals.

26. A system for accurate determination of the terrestrial position, timing coordinate, and velocity of an autonomous vehicle in real-time by transmitting signals from well-known locations, said system comprising:

an N-number of ground transmitters ($GT_i$), wherein each said $GT_i$ generates its own $L(GT_i)$ signal for providing ranging, timing, and velocity information at the user's location;

a base station (BS) for receiving said $L(GT_i)$ signals from each said $GT_i$, for calculating the differential correction data signal L(BS), and for transmitting said differential correction data signal L(BS) to said user's location;

a 2N-number of ground transmitter communication links $CLGT_i$ between each said $GT_i$ and said user, and between each said $GT_i$ and said base station (BS); and a communication link CLB between said base station and said user;

wherein said user receives the modulated by code $L(GT_i)$ signals from each said $GT_i$; and wherein said user receives said differential correction data signal L(BS) from said base station; and wherein the location coordinates of each said $GT_i$ and said base station are precisely known; and wherein each said $GT_i$ includes a $GT_i$ clock with an unknown clock bias $CB_{GTi}$ and an unknown clock drift $CD_{GTi}$; and wherein said base station includes a base station clock with an unknown clock bias $CB_{BS}$ and an unknown clock drift $CD_{BS}$.

27. The system of claim 26, wherein said N-number of ground transmitters ($GT_i$) comprises at least four $GT_i$, and wherein said user utilizes the $L(GT_i)$ signals generated by each said $GT_i$ and the differential correction data signal L(BS) generated by said base station (BS) in order to determine in real-time said user's position fixes, said user's timing coordinate, and said user's velocity.

28. The system of claim 26, wherein said N-number of ground transmitters ($GT_i$) comprises at least one $GT_i$, and wherein said user utilizes the $L(GT_i)$ signals generated by each said $GT_i$ and the differential correction data signal L(BS) generated by said base station (BS) in order to determine in real-time said user's timing coordinate.

29. The system of claim 26, wherein at least one said GT comprises a pseudolite, and wherein at least one said communication link CLGT comprises a pseudo-GPS communication link, and wherein at least one said GT transmits pseudo-GPS signals.

30. The system of claim 26, wherein said communication link CLB includes a radiowave frequency band.

31. The system of claim 26, wherein said communication link CLB includes an infrared frequency band.

32. The system of claim 26, wherein said communication link CLB includes a microwave frequency band.

33. The system of claim 26, wherein said communication link CLB includes the ISM (industrial scientific medical) unlicensed operation band, and wherein the ISM band range is selected from a class of frequency range consisting of 900 MHz, 2.4 GHz, and 5.8 GHz; and wherein the user can own the both ends of the ISM communication system.

34. The system of claim 26, wherein said communication link CLB includes a real time circuit switched communication link.

35. The system of claim 26, wherein said communication link CLB includes a 1.8 GHz band, wherein said 1.8 GHz band supports the personal communications services (PCS).

36. The system of claim 26, wherein said communication link CLB includes a system of Low Earth Orbiting Satellites (LEOS), a system of Medium Earth Orbiting Satellites (MEOS), or a system of Geostationary Earth Orbiting Satellites (GEOS), wherein said LEOS, MEOS, or GEOS systems are used to store and to forward digital packet data.

37. The system of claim 26, wherein said communication link CLB is selected from a class of radiowave communication links consisting of a cellular telephone communication means, paging signal receiving means, wireless messaging services, wireless application services, a wireless WAN/LAN station, and an Earth-satellite-Earth communication module that uses at least one satellite to relay a radiowave signal.

38. The system of claim 26, wherein said communication link CLB includes an Advanced Mobile Phone System (AMPS) including a modem, and wherein said modem is selected from a class consisting of a DSP (digital signal processor) modem, and a cellular digital packet data (CDPD) modem.

39. The system of claim 26, wherein said communication link CLB includes a digital cellular telephone communication means, and wherein said digital cellular telephone communication means includes a means of modulation of digital data over a radiolink selected from a class consisting of a time division multiple access (TDMA) system, a code division multiple access (CDMA) system, and a frequency division multiple access (FDMA).

40. The system of claim 26, wherein at least one said communication link CLGT includes a radiowave frequency band.

41. The system of claim 26, wherein at least one said communication link CLGT includes art infrared frequency band.

42. The system of claim 26, wherein at least one said communication link CLGT includes a microwave frequency band.

43. The system of claim 26, wherein at least one said communication link CLGT includes the ISM (industrial scientific medical) unlicensed operation band, and wherein the ISM band range is selected from a class of frequency range consisting of 900 MHz, 2.4 GHz, and 5.8 GHz; and wherein the user can own the both ends of the ISM communication system.

44. The system of claim 26, wherein at least one said communication link CLGT includes a real time circuit switched communication link.

45. The system of claim 26, wherein at least one said communication link CLGT includes a 1.8 GHz band, wherein said 1.8 GHz band supports the personal communications services (PCS).

46. The system of claim 26, wherein at least one said communication link CLGT includes a system of Low Earth Orbiting Satellites (LEOS), a system of Medium Earth Orbiting Satellites (MEOS), or a system of Geostationary Earth Orbiting Satellites (GEOS), wherein said LEOS, MEOS, or GEOS systems are used to store and to forward digital packet data.

47. The system of claim 26, wherein at least one said communication link CLGT is selected from a class of radiowave communication links consisting of a cellular telephone communication means, paging signal receiving means, wireless messaging services, wireless application services, a wireless WAN/LAN station, and an Earth-satellite-Earth communication module that uses at least one satellite to relay a radiowave signal.

48. The system of claim 26, wherein at least one said communication link CLGT includes an Advanced Mobile Phone System (AMPS) including a modem, and wherein said modem is selected from a class consisting of a DSP (digital signal processor) modem, and a cellular digital packet data (CDPD) modem.

49. The system of claim 26, wherein at least one said communication link CLGT includes a digital cellular telephone communication means, and wherein said digital cellular telephone communication means includes a means of modulation of digital data over a radiolink selected from a class consisting of a time division multiple access (TDMA) system, a code division multiple access (CDMA) system, and a frequency division multiple access (FDMA).

50. A method for accurate determination of the terrestrial position, timing coordinate, and velocity of an autonomous vehicle in real-time by transmitting signals from well-known locations, said method comprising the steps of:

providing a K-number of $SATPS_j$ satellites;

generating satellite signals $L(SATPS_j)$ by each said $SATPS_j$ satellite for providing ranging, timing, and velocity information at the user's location;

providing an N-number of ground transmitters;

generating ground transmitter $L(GT_i)$ signals by each said $GT_i$ for providing ranging, timing, and velocity information at the user's location;

providing a base station (BS);

receiving the $L(SATPS_j)$ signals from each said $SATPS_j$ satellite by said base station (BS);

receiving the $L(GT_i)$ signals from each said $GT_i$ by said base station (BS);

calculating the differential correction data signal L(BS) by said base station (BS);

transmitting the differential correction data signal L(BS) to said user's location by said base station (BS);

receiving the satellite $L(SATPS_j)$ signals from each said satellite $SATPS_j$ by said user;

receiving the $L(GT_i)$ signals from each said $GT_i$ by said user; receiving the differential correction data signal L(BS) from said base station by said user; and accurately determining the terrestrial position, timing coordinate, and velocity of the autonomous vehicle by said user.

51. The method of claim 50, further including a step of providing a synchronization signal to each said $GT_i$.

52. The method of claim 50, further including a step of initialization of each said $GT_i$, wherein said step of initialization includes a step of providing the location coordinates for each said $GT_i$.

53. A method for accurate determination of the terrestrial position, timing coordinate, and velocity of an autonomous vehicle in real-time by transmitting signals from well-known locations, said method comprising the steps of:

providing an N-number of ground transmitters;

generating ground transmitter $L(GT_i)$ signals by each said $GT_i$ for providing ranging, timing, and velocity information at the user's location;

providing a base station (BS);

receiving the $L(GT_i)$ signals from each said $GT_i$ by said base station (BS);

calculating the differential correction data signal L(BS) by said base station (BS);

transmitting the differential correction data signal L(BS) to said user's location by said base station (BS);

receiving the $L(GT_i)$ signals from each said $GT_i$ by said user;

receiving the differential correction data signal L(BS) from said base station by said user; and accurately determining the terrestrial position, timing coordinate, and velocity of the autonomous vehicle by said user.

54. The method of claim 53, further including a step of providing a synchronization signal to each said $GT_i$.

55. The method of claim 53, further including a step of initialization of each said $GT_i$, wherein said step of initialization includes a step of providing the location coordinates for each said $GT_i$.

* * * * *